Dec. 6, 1966 Z. J. LANSKY 3,289,511
APPARATUS FOR PUNCHING A HOLE BY A TOOL
INSIDE A HOLLOW WORKPIECE
Filed May 6, 1963
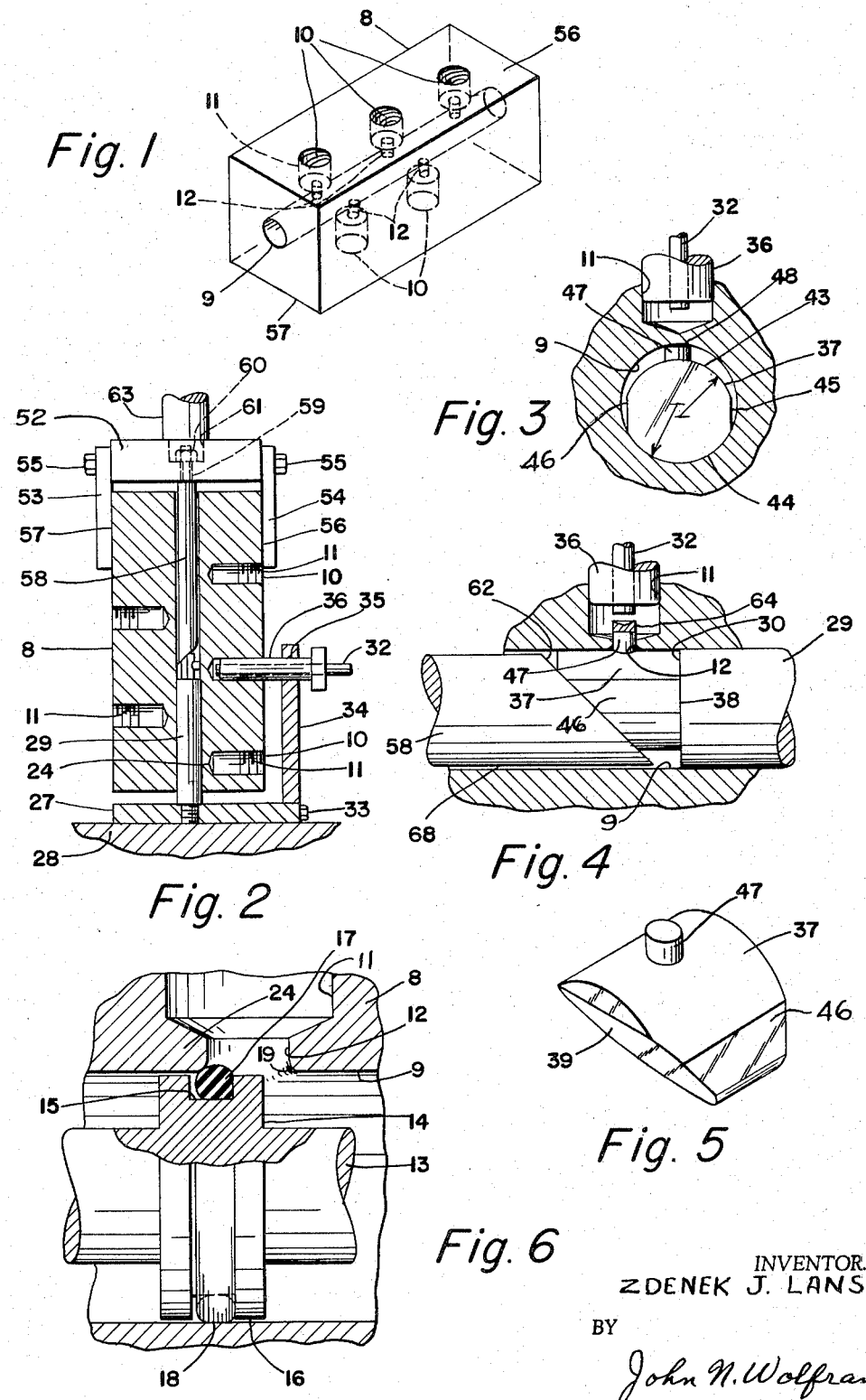
INVENTOR.
ZDENEK J. LANSKY
BY
John N. Wolfram
ATTORNEY

United States Patent Office 3,289,511
Patented Dec. 6, 1966

3,289,511
APPARATUS FOR PUNCHING A HOLE BY A TOOL INSIDE A HOLLOW WORKPIECE
Zdenek J. Lansky, Winnetka, Ill., assignor to Parker-Hannifin Corporation, Cleveland, Ohio
Filed May 6, 1963, Ser. No. 277,999
3 Claims. (Cl. 83—191)

This invention relates to bodies for valves of the sliding spool type in which a spool carries a resilient sealing member which must pass a flow port intersecting a valve bore, and also relates to apparatus for forming the flow ports in such valve bodies.

In valves of the type mentioned, the flow ports and valve bore are often formed by drilling or boring, with perhaps an additional operation, such as honing, grinding, or burnishing of the valve bore. As a result, the intersection of the flow port with the bore is initially a sharp edge which usually has a burr thereon. The practice now is to attempt to remove the burr and sharp edge by a cutting operation such as scraping or grinding. These methods are very unsatisfactory in that it is very difficult to eliminate the entire sharp edge, or ot round it smoothly and uniformly.

If the edge is not well rounded, it is difficult to slide the resilient member past the intersection of the flow port with the valve bore without cuttng, pinching, or otherwise damaging the resilient member. This is particularly true when high fluid pressures are used since the fluid pressure tends to distort the resilient member into the flow port as it passes such port and also resists return of the resilient member to the confines of the valve bore as the edge of the flow port is approached by the resilient member.

It is an object of the present invention to provide a valve body in which the intersections of the valve bore with flow ports are completely devoid of sharp edges and are appreciably rounded or chamfered so as to eliminate cutting or pinching action upon resilient sealing members carried by the valve spool.

It is another object to provide a valve body of the type described in which rounding of the intersection between the valve bore and flow ports is accomplished by displacement of flow of the body material.

Another object is to provide a method of forming the valve ports to that rounding of the intersections with the valve bore is automatically accomplished at the same time.

Another object is to provide an apparatus for punching the flow port openings in such a manner that the intersections with the valve bore are rounded as a consequence of the punching operation.

It is another object to provide apparatus for punching the flow ports in a valve body with a punch located in the valve bore, and with means for properly locating and orienting the punch so that the flow port will be formed in the proper angular and axial location with respect to the valve bore.

Other objects of the invention will be apparent from the following description and from the drawings in which:

FIG. 1 is a perspective view of a valve body,

FIG. 2 shows the valve body in longitudinal cross section and in position on apparatus for punching the flow ports, FIG. 3 is a fragmentary transverse cross section through the valve body through one of the flow port locations and showing an end view of the punch in the valve bore, FIG. 4 is a fragmentary longitudinal cross section view through the valve body showing the position of the punch after it has formed the flow port, FIG. 5 is a perspective view of the punch, and FIG. 6 is an enlarged longitudinal cross section view of the valve body showing a valve spool with a resilient element thereon and with the resilient element in a position opposite a flow port.

As shown in FIG. 1, a valve body 8 made in accordance with the present invention may be of rectangular shape and have a valve bore 9 therthrough. The valve body has a plurality of flow ports 10 whose outer portion 11 are open to the exterior of the valve body and whose inner portions 12 intersect valve bore 9 at spacer locations.

As shown in FIG. 6, a valve spool 13 may be slidably mounted within bore 9 and have a series of grooved enlargements 14 thereon for controlling flow of fluid between selected flow ports 10, only one of such enlargements 14 being shown in FIG. 6. Enlargement 14 has a close clearance 16 with the wall of bore 9 and has a resilient sealing member 17 located in groove 15 for engaging in sealing contact with bore 9. As shown, sealing member 17 may be in the form of an O-ring of rubberlike material and initially of a cross section diameter that is slightly larger than the distance from the bottom of groove 15 to the wall of bore 9 so that the cross section of the O-ring will be slightly flattened as at 18 when in engagement with the wall of bore 9. Due to its resilient nature, the portion of the O-ring which is opposite flow port section 12 as the O-ring passes the latter will resume its unflattened condition on its outer diameter and project slightly into the flow port as illustrated in FIG. 6.

In accordance with the present invention, the edge of flow port section 12 where it intersects bore 9 is well rounded as at 19. As spool 13 is moved leftwardly to the position shown in FIG. 6, the portion of O-ring 17 which projects into flow port inner portion 12 contact rounded edge 19 and is pushed back into groove 15 without cutting or pinching of the same, as would otherwise occur if edge 19 were not rounded.

In forming flow ports 10, the outer portion 11 is first formed by drilling and tapping from the exterior of the body inwardly to a depth to leave a relatively thin web 24 adjacent bore 9. The valve body is then mounted in a punching apparatus in the manner shown in FIG. 2, and placed in a punch press or the like for punching the inner portion 12 of the flow ports.

The punching apparatus includes a plate 27 which may be placed on a bed 28 of a punch press. Plate 27 has a mandrel 29 threaded thereto, the mandrel being of a diameter to closely fit valve bore 9 and having a transverse end surface 30 which is normal to the axis of the mandrel. Attached to plate 27 by bolts 33 is another plate 34 which has an opening 35 therethrough for receiving a guide pin 36 which has a drive pin 32 slidably mounted therein. As shown in FIG. 2, pin 36 has a vertical location with respect to end surface 30 of the mandrel so that a punch or die member 37 will be properly located axially along bore 9 with respect to any of the flow ports 10 in which pin 36 is inserted when the punch is in contact with mandrel end surface 30.

Punch 37 has a transverse face 38 normal to its axis, this face being engageable with end surface 30 of mandrel 29. The opposite end of punch 37 has a face 39 which is beveled, that is, is at an angle with respect to the axis of the punch.

As shown in FIG. 3, punch 37 is formed with upper and lower cylindrical surfaces 43, 44 which have radii corresponding to the radius of valve bore 9 but the centers of curvature for faces 43, 44 are vertically offset so that surface 43 is spaced from valve bore 9 when bottom surface 44 is in contact therewith. The sides of punch 37 are flatted as at 45, 46 to also provide clearance with valve bore 9 so that the punch may move upwardly with bore 9 as viewed in FIG. 3. The punch has a pin projecting upwardly from surface 43. Preferably, the upper surface 48 of pin 47 is cylindrical on a radius to match the radius of bore 9 and is closely adjacent the wall of bore 9 when the punch is initially placed within the bore.

The apparatus shown in FIG. 2 also includes a plate 52 having guide plates 53, 54 attached thereto by means of bolts 55. Plates 53, 54 have flat surfaces engageable in guiding contact with upper and lower flat faces 56, 57 of valve body 8.

Another mandrel 58 is attached to plate 52 by means of a threaded end 59 and a nut 60, the nut being within a recess 61 in plate 52. Mandrel 58 has a beveled end face 62 for flat engagement with beveled face 39 of punch 37. Mandrel 58 is angularly positioned with respect to plates 53, 54 so that when the latter are in guiding contact with valve faces 56, 57 beveled face 62 of mandrel 58 by contact with beveled face 39 of the punch will angularly locate the punch within bore 9 so that pin 47 is in correct alignment with the flow port 10 which is to have its inner portion 12 formed by the punch.

Plate 52 is engageable by ram 63 of the press for moving mandrel 58 downwardly. As mandrel 58 moves downwardly, its beveled surface 63 engages beveled surface 39 of the punch and automatically turns the latter to its position of correct angular alignment. Further downward movement of mandrel 58 forces punch 37 to move to the right, as viewed in FIG. 2, and causes pin 47 to punch a hole through web 24, the severed metal being shown at 64. During this punching action the inner edge of the hole 12 being formed, that is, the intersection of hole 12 with bore 9, will become well rounded, as shown at 19, due to the flow of metal of web 24 as it is being acted upon by pin 47.

After a flow port opening 12 has been punched in the manner indicated, ram 63 may be raised and plate 52 lifted or removed from the valve body. Drive pin 32 may then be driven against pin 47 to force punch 37 back to its initial position within bore 9. Thereafter pins 32 and 36 may be removed from port 10 and body 8 may be repositioned on mandrel 29 until pins 32, 36 line up with another port 10. The pins are then inserted into the latter port, mandrel 58 reinserted into bore 9 and guide plates 53, 54 brought into engagement with valve body surfaces 56, 57 and the punching operation repeated.

Mandrel 29 may be fitted as closely within valve bore 9 as customary machining tolerances will allow, but it is preferred that mandrel 58 have enough clearance 68 to make up for normal manufacturing variances in the positioning of bore 9 between valve surfaces 56, 57 so that mandrel 58 may at all times enter bore 9 when plates 53, 54 are in guiding contact with surfaces 56, 57.

I claim:

1. In apparatus for forming an inner portion of a flow port in a valve body by punching a hole through a web separating an outer portion of the flow port from a valve bore in the body, first and second mandrels insertible in said bore, a punch insertible in said bore between the mandrels, a stop surface on the first mandrel engageable by the punch for locating the axial position of the punch within the bore, a member supporting the first mandrel, a locating pin carried by said member, said pin being insertible within said outer portion whereby said pin and member locate the axial position of said first mandrel within said bore, said second mandrel being engageable with said punch for moving the same laterally of the bore, and a pin projecting from the punch for punching a hole through the web when the punch is moved laterally by the second mandrel.

2. The apparatus of claim 1 in which the locating pin is movably mounted on the member to permit insertion and withdrawal from said outer portion.

3. The apparatus of claim 1 in which the locating pin is hollow and a drive pin mounted therein is movable into engagement with the pin on the punch for expelling the latter pin from the web.

References Cited by the Examiner

UNITED STATES PATENTS

| | | | |
|---|---|---|---|
| 295,090 | 3/1884 | Whitman | 83—191 X |
| 750,746 | 1/1904 | Woodburn | 83—191 |
| 1,521,866 | 1/1925 | Carlson | 83—191 X |
| 1,920,303 | 8/1933 | Grotnes | 83—191 X |
| 2,426,106 | 8/1947 | Kinley | 166—55.3 X |
| 2,727,256 | 12/1955 | Moore | 10—10 |
| 2,737,831 | 3/1956 | Webb | 76—107 |
| 2,972,779 | 2/1961 | Cowley | 83—54 X |
| 3,122,154 | 2/1964 | Siebel et al. | 251—324 X |
| 3,141,358 | 7/1964 | Burke et al. | 76—107 |

ANDREW R. JUHASZ, *Primary Examiner.*

J. M. MEISTER, *Assistant Examiner.*